United States Patent [19]
Nelson

[11] Patent Number: 4,601,758
[45] Date of Patent: Jul. 22, 1986

[54] SULFONATED POLY (VINYL AROMATICS) AS FLUID LOSS ADDITIVES FOR SALT CEMENT SLURRIES

[75] Inventor: Erik B. Nelson, Broken Arrow, Okla.

[73] Assignee: Dowell Schlumberger Incorporated, Tulsa, Okla.

[21] Appl. No.: 704,818

[22] Filed: Feb. 25, 1985

[51] Int. Cl.$^4$ .................................................. C04B 7/35
[52] U.S. Cl. .................................. 106/90; 106/314; 166/293
[58] Field of Search ................ 106/90, 314, 315; 166/293

[56] References Cited

U.S. PATENT DOCUMENTS

| | | | |
|---|---|---|---|
| 3,234,154 | 2/1966 | Martin | 106/90 |
| 4,036,660 | 7/1977 | Persinski et al. | 106/90 |
| 4,469,518 | 9/1984 | McKenzie | 106/314 |

FOREIGN PATENT DOCUMENTS

| | | | |
|---|---|---|---|
| 49-5424 | 1/1974 | Japan | 106/315 |
| 54-17918 | 2/1979 | Japan | 106/315 |

*Primary Examiner*—William R. Dixon, Jr.
*Assistant Examiner*—Steven Capella
*Attorney, Agent, or Firm*—L. Wayne White

[57] ABSTRACT

A salt water hydraulic cement slurry and method of use in oil and gas well cement jobs involving a novel fluid loss additive comprising an admixture of sulfonated aromatic polymers. An effective amount of an admixture of water soluble salts of a sulfonated styrene/maleic anhydride copolymer, sulfonated polystyrene, sulfonated polyvinyltoluene and sulfonated polynaphthalene/formaldehyde condensate when added to a salt water/Portland cement slurry provides fluid loss control to the Portland cement slurry at bottomhole circulating temperature between 80° and 210° F. Further, addition of and/or the replacement of the sulfonated polystyrene by a water soluble lignosulfonate further enhances the high temperature properties of the salt water cement slurry.

One exception to this appears in British Pat. No. 2,080,812 which describes the use of very low molecular weight carboxymethylhydroxyethylcellulose polymers in combination with hydroxycarboxy acids as fluid loss additives for salt water cement slurries.

23 Claims, 1 Drawing Figure

Typical Fluid Loss Control Performance of Additive Composition No. 25

Fig. 1

SULFONATED POLY (VINYL AROMATICS) AS FLUID LOSS ADDITIVES FOR SALT CEMENT SLURRIES

BACKGROUND OF THE INVENTION

1. Field of the Invention

This invention relates to novel compositions comprising poly(vinyl aromatics) and their use as fluid loss additives in cement slurries having a high salt concentration.

2. Technical Review

The concept of pumping a cement slurry down a wellbore and back up the annulus between the casing and the wellbore in order to set the casing in cement is a well known and well documented commercial practice. Various additives are normally added to the cement slurries used in such instances to achieve specific results or properties in the cement slurry while it is being pumped or in the cement after it is emplaced. For example, dispersants, retarders, fluid loss additives, and the like are normally added to cement slurries prior to pumping and placement of the slurry in the wellbore.

Fluid loss is a severe problem for most cements used in this application and the problem is unusually severe with cement slurries having a high salt concentration. Additives which are known to impart fluid loss control to the slurries tend to be very powerful retarders that prevent the slurry from developing adequate strength for extended periods. Even salt itself retards the setting of the cement when the salt is present in high concentrations.

Other conventional additives also have diverging properties on the cement slurry which make them unsatisfactory. This is illustrated, at least in part, by the three classes of sulfonated poly(vinyl aromatics) cited below which have been used singly, but not in combination, as cement additives.

The sodium salt of sulfonated polynaphthalenes are known dispersants for cement slurries. However they have not been employed in cement slurries as fluid loss additives. In contrast, the sulfonated polystyrenes are known cement dispersants which exhibit good fluid loss control (even at relatively high salt concentrations), but they retard the setting of the cement dramatically and thus, are not suitable for uses as cement dispersants. Also, the sodium salts of sulfonated polyvinyltoluene are unsatisfactory because they are known to be poor dispersants and they can cause gelation of the cement slurry. Sulfonated polyvinyltoluenes have historically been used as fluid loss additives, but are inadequate when used in cement slurries having a high salt content (e.g., from about 17 to about 18 weight percent sodium chloride in the aqueous phase).

Thus, it is generally recognized in the well service industry that the fluid loss additives presently available today are generally inadequate, especially in cement slurries having a high salt concentration.

To the best knowledge of the present inventor, no one has ever taught or suggested that a combination of the above three classes of sulfonated poly(vinyl aromatics) would produce a fluid loss additive that works extremely well, even in the presence of high salt concentration.

SUMMARY OF THE INVENTION

In view of the problems associated with the prior art, the present invention provides novel salt water slurries and a method of using the same involving a salt water fluid loss additive based on an admixture of water soluble sulfonated poly(vinyl aromatics). The novel salt water fluid loss additives of the present invention involve four component blends of sulfonated polymers which provide fluid loss control to Portland cement slurries at bottomhole circulating temperatures between about 80° and about 210° F. These polymers are solid dry-blendable powders which cement slurries used in can be conveniently and readily employed in oil field applications.

Thus, the present invention is an improved cement slurry containing a hydraulic cement, salt, water, and an effective amount of a fluid loss additive comprising an admixture of at least:

(a) about 0.5 parts by weight of a water soluble sulfonated styrene/maleic anhydride copolymer;

(b) about 0.5 parts by weight of a water soluble salt of a sulfonated polystyrene;

(c) about 0.5 parts by weight of a water soluble salt of a sulfonated polyvinyltoluene; and (d) about 0.5 parts by weight of a water soluble salt of sulfonated polynaphthalene/formaldehyde condensate. As used herein, all parts by weight are parts by weight per 100 parts by weight of dry hydraulic cement.

In the novel cement slurry, a water soluble lignosulfonate can be added in amounts of about 0.1 parts by weight or more as an additional fluid loss additive and/or a substitute or partial substitute for the water soluble salt of a sulfonated polystyrene.

The use of the novel cement slurry in cementing casings and the like in wellbores is an improvement in the known process and is novel.

Likewise, dry blends of materials comprising components (a), (b), (c) and (d) above are new compositions of matter.

Thus, the novel cement slurry composition according to the present invention comprises for every 100 parts by weight of additive:

(a) from about 12.5 parts by weight of about 25 parts by weight of a water soluble sulfonated polystyrene/maleic anhydride copolymer;

(b) from about 12.5 parts by weight of about 50 parts by weight of a compound selected from the group consisting of:
  (i) a water soluble salt of a sulfonated polystyrene,
  (ii) a water soluble lignosulfonate, and
  (iii) admixtures of a water soluble salt of a sulfonated polystyrene and a water soluble lignosulfonate;

(c) from about 12.5 parts by weight of about 60 parts by weight of a water soluble salt of a sulfonated polyvinyltoluene; and (d) from about 12.5 parts by weight of about 50 parts by weight of a water soluble salt of naphthalene sulfonate/formaldehyde condensate.

And, the process according to the present invention is a method of cementing a well traversing subterranean formation consisting with admixing with every 100 parts by weight of dry hydraulic cement at least:

(i) 0.5 parts by weight of a water soluble sulfonated styrene/maleic anhydride copolymer per 100 parts by weight of dry hydraulic cement;

(ii) 0.5 parts by weight of a water soluble salt of a sulfonated polystyrene per 100 parts by weight of dry hydraulic cement;

(iii) 0.5 parts by weight of a water soluble salt of a sulfonated polyvinyltoluene per 100 parts by weight of dry hydraulic cement; and (iv) 0.5 parts by weight of a water soluble salt of sulfonated polynaphthalene/formaldehyde condensate and from about 35 to 55 parts by weight of a saline water solution, to prepare an aqueous slurry, and injecting said slurry down the well into confined zone in the formation, and closing in the well until said slurry has set to a hard monolithic mass.

It is an object of the present invention to provide a fluid loss additive composition for use in cement slurries wherein the aqueous phase of the cement slurry contains a high concentration of dissolved NaCl; e.g., as encountered when setting casing in wellbores in oil field applications. It is a further object of the present invention for the fluid loss additive to provide fluid loss control in cement slurries prepared with mix water containing from about 18 to about 37 percent salt in the temperature range from 80° to 210° F. And, it is an object of the present invention to provide such a salt water fluid loss additive that satisfies criteria imposed by current industry standards on oil field cements.

DETAILED DESCRIPTION OF THE INVENTION

The water soluble poly(vinyl aromatics) employed in the present invention to make the novel salt water fluid loss additives and novel salt water hydraulic cement slurries are well known classes of polymers with known methods of preparation. Typically, the polymers are prepared and used as water soluble salts of sulfonated vinyl aromatic polymers or polymeric compositions that produce the same when mixed with saline or brackish water, suitable such polymers include for example, the alkaline metal salts, alkaline earth metal salts and acid forms of the sulfonated poly(vinyl aromatics) polymers. Thus, the present invention contemplates the use of blends or mixtures of: sulfonated polystyrenes and copolymers; sulfonated polymers of styrene and maleic anhydride; lignosulfonates; sulfonated polynaphthalene and copolymers, such as sulfonated polynapthalene/formaldehyde condensate; and the like.

Preferred compositions include a mixture of (a) a soluble polystyrene/maleic anhydride polymer, (b) a water soluble polystyrene and/or lignosulfonate, (c) a water soluble polyvinyltoluene, and (d) a water soluble polynaphthalene/formaldehyde condensate.

The sulfonated copolymers of styrene and maleic anhydride in the present invention are represented by the general formula:

(1)

wherein M represents a cation selected from the group consisting of alkaline metal, alkaline earth metal, hydrogen or other cation capable of rendering a soluble polymer in salt water and the x and y represent the degree of copolymerization. Preferably, the sodium salt or corresponding partial acid form of the polymer is employed and the copolymerization preferably involves stoichiometrically equivalent amounts of alternating styrene and maleic anhydride monomer. Further, a relatively low molecular weight polymer is preferred. It has been found that a sodium salt of a sulfonated 1:1 copolymer of styrene and maleic anhydride with a molecular weight of about 3,000 will act as an excellent cement dispersant in salt water and shows remarkable fluid loss control ability. However, at concentrations in excess of about 0.5 parts by weight, the copolymer tends to severely retard the cement setting time.

The sulfonated polystyrene components of the preferred composition are represented by the formula:

(2)

where again X represents a cation, such as an alkaline metal, alkaline earth metal, hydrogen or other cation capable of generating a water soluble polymer in salt water, and x represents the degree of polymerization. Preferably, the water soluble sulfonated polystyrene component is a relatively high molecular weight in comparison to the previous sulfonated styrene/maleic anhydride component. Sulfonated polystyrenes characterized by a molecular weight of from about 70,000 to about 600,000 or higher are operable for purposes of this invention. Preferably, the sodium salt or corresponding partial acid form of a sulfonated polystyrene having a molecular weight of about 70,000 to about 600,000 or higher is to be employed.

Water soluble lignosulfonates, such as calcium lignosulfonate or sodium lignosulfonate, and the like, can be used to supplement or replace the water soluble sulfonated polystyrene components according to the present invention. The lignosulfonates tend to improve and preserve the desirable cement slurry properties at high temperatures and the presence of such compounds as an additive or as a substitute for the sulfonated polystyrene is particularly preferred.

The water soluble polyvinyltoluene component according to the present invention is again a highly sulfonated poly(vinyl aromatic) and is generally represented by the formula:

(3)

where M is again a cation or hydrogen and x is the degree of polymerization. Preferably, a high molecular weight polymer, relative to the molecular weight of the polystyrene/maleic anhydride component, is employed. A sodium salt of sulfonated polyvinyltoluene with a molecular weight from about 500,000 to about 2,000,000 is preferred.

The fourth water soluble poly(vinyl aromatic) component in the admixture according to the present invention, is a water soluble sulfonated polynaphthalene/formaldehyde condensate represented by the formula:

where M is again a cation or hydrogen and x is the degree of polymerization. Preferably, the sulfonated polynaphthalene/formaldehyde condensate is a low molecular weight polymer in the form of a water soluble salt or corresponding partial acid form the polymer. The sodium salt of sulfonated polynaphthalene/formaldehyde condensate having a molecular weight of from about 3,000 to about 20,000 is particularly preferred.

In view of the fact that all four categories of water soluble sulfonated polymers are sulfonated poly(vinyl aromatics) and in view of the diversity of behavior between members of the four distinct classes when employed individually, the mutual effect of a composite of four was totally unpredictable. The present invention involves such combinations wherein the presence of the additive mixture in a Portland cement slurry imparts excellent fluid loss properties even at high salt concentrations and high temperatures. Additionally the additive mixture provided excellent dispersion without retarding the set of the cement to an impractical extent.

Experimental

A systematic program was initiated to further identify optimum compositions of four component systems that provide fluid loss control when added to cement slurries prepared with mix water containing 18 to 37 percent salt in the temperature range of 80° to 250° F., conditions generally considered to be representative for fluid loss control for oil and gas well cements. If a composition works well in 18 percent salt water and 200° F., it should be effective over the range of 18 to 37 percent salt and 80° to 200° F. These tests were performed at a constant total fluid loss additive concentration of 4 parts by weight, while the relative ratios of the four components were varied. The concentration of SPS/MA 3 was not allowed to exceed 1.0 percent due to the strong retardation tendencies. SPS/MA 3 was present in increments of 0.1, 0.5 and 1.0 parts by weight. SPS 70 and SPN/F 3 were varied in increments of 0.1, 0.5, 1.0 and 2.0 parts by weight. As the other three components were varied, the SPVT was added in quantities sufficient to make the total additive concentration equal to 4.0 parts by weight; thus, its concentration ranged from 0.5 to 3.7 parts by weight. The cement slurry was Lone Star class H cement at 40 parts by weight and 18 percent sodium chloride by weight of water. Having once identified the best performing combinations of sulfonated poly(vinyl aromatic) polymers, the combinations ability to provide fluid-loss control in slurries at the other three extremes of temperature and salt content were evaluated. The results of this experimental program are presented in Table IV.

TABLE IV

OPTIMIZATION SALT WATER FLUID-LOSS ADDITIVE
Basic Slurry: Lone Star H + 40% H$_2$O + 18%
NaCl (BWOW) + 4.0% Additive (BWOC)
BHCT = 200° F.

| | PERCENT ADDITIVE (BWOC) | | | | API FLUID LOSS | |
|---|---|---|---|---|---|---|
| No. | SPS/MA 3 | SPS 70 | SPVT | SPN/F 3 | mL/30 Min. | Comments |
| | 0.1 | 0.1 | 1.8 | 2.0 | — | Gellation during mixing |
| | 0.1 | 0.5 | 1.4 | 2.0 | — | Gellation during mixing |
| | 0.1 | 1.0 | 0.9 | 2.0 | — | Gellation during mixing |
| | 0.1 | 0.1 | 2.8 | 1.0 | — | Gellation during mixing |
| | 0.1 | 0.5 | 2.4 | 1.0 | — | Gellation during mixing |
| | 0.1 | 1.0 | 1.9 | 1.0 | — | Gellation during mixing |
| | 0.1 | 2.0 | 0.9 | 1.0 | — | Gellation during mixing |
| | 0.1 | 0.1 | 3.3 | 0.5 | — | Gellation during mixing |
| | 0.1 | 0.5 | 2.9 | 0.5 | — | Gellation during mixing |
| | 0.1 | 1.0 | 2.4 | 0.5 | — | Gellation during mixing |
| | 0.1 | 2.0 | 1.4 | 0.5 | — | Gellation during mixing |
| | 0.1 | 0.1 | 3.7 | 0.1 | — | Gellation during mixing |
| | 0.1 | 0.5 | 3.3 | 0.1 | — | Gellation during mixing |
| | 0.1 | 1.0 | 2.8 | 0.1 | — | Gellation during mixing |
| | 0.1 | 2.0 | 1.8 | 0.1 | — | Gellation during mixing |
| | 0.5 | 0.1 | 1.4 | 2.0 | 245 | Mix OK - pourable |
| | 0.5 | 0.5 | 1.0 | 2.0 | +500 | Mix OK - pourable |
| | 0.5 | 1.0 | 0.5 | 2.0 | +500 | Mix OK - pourable |
| | 0.5 | 0.1 | 2.4 | 1.0 | 273 | Mix OK - pourable |
| | 0.5 | 0.5 | 2.0 | 1.0 | 245 | Mix OK - pourable |
| | 0.5 | 1.0 | 1.5 | 1.0 | 385 | Mix OK - pourable |
| | 0.5 | 2.0 | 0.5 | 1.0 | 180 | Mix OK - pourable |
| | 0.5 | 0.1 | 2.9 | 0.5 | — | Gellation during mixing |
| | 0.5 | 0.5 | 2.5 | 0.5 | — | Gellation during mixing |
| | 0.5 | 1.0 | 2.0 | 0.5 | 18 | Mix OK - pourable |
| | 0.5 | 2.0 | 1.0 | 0.5 | 114 | Mix OK - pourable |
| | 0.5 | 0.1 | 3.3 | 0.1 | — | Gellation during mixing |
| | 0.5 | 0.5 | 2.9 | 0.1 | — | Gellation during mixing |
| | 0.5 | 1.0 | 2.4 | 0.1 | 98 | Mix OK - Thick consistency |
| | 0.5 | 2.0 | 1.4 | 0.1 | 107 | Mix OK - pourable |

TABLE IV-continued

OPTIMIZATION SALT WATER FLUID-LOSS ADDITIVE
Basic Slurry: Lone Star H + 40% $H_2O$ + 18%
NaCl (BWOW) + 4.0% Additive (BWOC)
BHCT = 200° F.

| No. | PERCENT ADDITIVE (BWOC) | | | | API FLUID LOSS mL/30 Min. | Comments |
|---|---|---|---|---|---|---|
| | SPS/MA 3 | SPS 70 | SPVT | SPN/F 3 | | |
| 31 | 1.0 | 0.1 | 0.9 | 2.0 | 14 | Mix OK - pourable |
| 32 | 1.0 | 0.5 | 0.5 | 2.0 | 182 | Mix OK - pourable |
| 33 | 1.0 | 0.1 | 1.9 | 1.0 | 80 | Mix OK - pourable |
| 34 | 1.0 | 0.5 | 1.5 | 1.0 | 76 | Mix OK - pourable |
| 35 | 1.0 | 1.0 | 1.0 | 1.0 | 26 | Mix OK - pourable |
| 36 | 1.0 | 0.1 | 2.4 | 0.5 | 117 | Difficult to mix |
| 37 | 1.0 | 0.5 | 2.0 | 0.5 | 72 | Mix OK - pourable |
| 38 | 1.0 | 1.0 | 1.5 | 0.5 | 88 | Mix OK - pourable |
| 39 | 1.0 | 2.0 | 0.5 | 0.5 | — | Gellation during mixing |

Of the tests performed, only eight systems imparted fluid loss control of less than 100 mL/30 min. Fluid loss tests could not be performed with 20 of the combinations due to severe gelation during mixing or the 20 minutes stirring period. All systems containing less than 0.5 percent SPS/MA 3 and some systems with high concentration of SPVT gelled. The best performance in the series were Tests 25 and 31. System 25 was further tested as to its ability to provide fluid loss control at 80° F. and 10 percent NaCl, 80° F. and 37 percent NaCl as well as 200° F. and 37 percent NaCl. The results of the further testing are presented in Table V and successfully indicate that a composition of 25 percent SPS/MA 3, 2.5 percent SPS 70, 22.5 percent SPVT and 50 percent SPN/F 3 has fluid loss characteristics broadly across the range(s) of interest.

Figure 1:
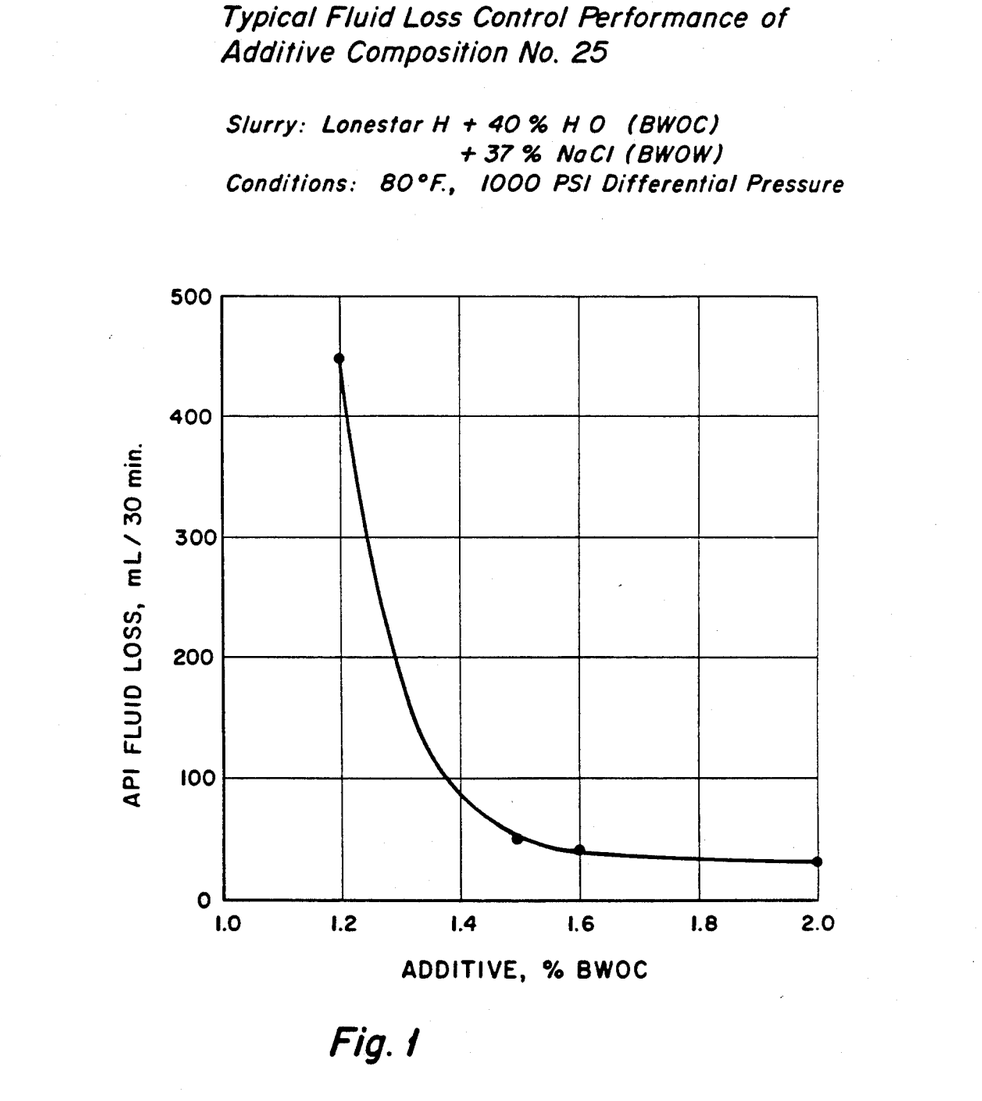
FIG. 1 illustrates the typical fluid loss control performance of an additive according to the present invention by presenting a plot of the APE Fluid Loss in mL per 30 minutes as a function of percent of additive by weight of cement (i.e. parts by weight).

The system was further tested with six cements for fluid loss control evaluation, representing a cross section of commonly used API classes and brands. Tests were performed at 80°, 110°, 140°, 170° and 200° F. in slurries containing 10 percent, 18 percent and 37 percent NaCl by weight of water. With most cements, between 1.0 percent and 2.0 percent of the additive by weight of cement was required to achieve fluid loss control below 100 mL/30 min. As illustrated in FIG. 1, a critical concentration of the additive was necessary to achieve adequate fluid loss control. Below that level, fluid loss rapidly increased.

TABLE V

Performance of Test Composition No. 25
With Various Cement Systems

| Cement Type[1] | $H_2O$ (% BWOC)[2] | NaCl (% BWOW)[3] | Comp. No. 25 (% BWOC) | BHCT (°F.) | API Fluid Loss (mL/30 Min.) |
|---|---|---|---|---|---|
| OA | 46 | 10 | 1.0 | 80 | 36 |
| OA | 46 | 10 | 1.2 | 110 | 32 |
| OA | 46 | 10 | 1.5 | 140 | 20 |
| OA | 46 | 18 | 1.0 | 80 | 40 |
| OA | 46 | 18 | 1.2 | 110 | 32 |
| OA | 46 | 18 | 1.5 | 140 | 28 |
| OA | 46 | 18 | 1.8 | 170 | 28 |
| OA | 46 | 18 | 1.8 | 200 | 146 |
| OA | 46 | 18 | 2.0 | 200 | 24 |
| OA | 46 | 37 | 1.2 | 80 | 318 |
| OA | 46 | 37 | 1.4 | 80 | 69 |
| OA | 46 | 37 | 1.2 | 110 | 550 |
| OA | 46 | 37 | 1.2 | 140 | 94 |
| OA | 46 | 37 | 1.1 | 170 | 74 |
| OA | 46 | 37 | 1.0 | 200 | 76 |
| LH | 40 | ·18 | 1.8 | 170 | 90 |
| LH | 40 | 18 | 1.8 | 200 | 145 |
| LH | 40 | 18 | 2.0 | 200 | 21 |
| LH | 40 | 37 | 1.2 | 80 | 447 |
| LH | 40 | 37 | 1.5 | 80 | 47 |
| LH | 40 | 37 | 1.2 | 110 | 86 |
| LH | 40 | 37 | 1.2 | 140 | 64 |
| LH | 40 | 37 | 1.1 | 170 | 34 |
| LH | 40 | 37 | 1.0 | 200 | 42 |
| IGD | 44 | 10 | 1.4 | 80 | 14 |
| IGD | 44 | 10 | 1.2 | 110 | 23 |
| IGD | 44 | 10 | 1.5 | 140 | +500 |
| IGD | 44 | 18 | 1.0 | 80 | +500 |
| IGD | 44 | 18 | 1.2 | 80 | 2 |
| IGD | 44 | 18 | 1.2 | 110 | 34 |
| IGD | 44 | 18 | 1.5 | 140 | 18 |
| IGD | 44 | 18 | 1.8 | 170 | |
| IGD | 44 | 18 | 2.0 | 200 | 74 |
| IGD | 44 | 37 | 1.2 | 80 | 245 |
| IGD | 44 | 37 | 1.4 | 80 | 42 |
| IGD | 44 | 37 | 1.2 | 110 | 68 |
| IGD | 44 | 37 | 1.2 | 140 | 26 |
| IGD | 44 | 37 | 1.1 | 170 | +500 |
| IGD | 44 | 37 | 1.3 | 170 | 28 |
| IGD | 44 | 37 | 1.4 | 200 | 23 |
| LAH | 40 | 10 | 1.0 | 80 | +500 |
| LAH | 40 | 10 | 1.2 | 80 | 14 |
| LAH | 40 | 10 | 1.2 | 110 | 16 |
| LAH | 40 | 10 | 1.5 | 140 | 153 |
| LAH | 40 | 18 | 1.0 | 80 | 84 |
| LAH | 40 | 18 | 1.2 | 110 | 16 |
| LAH | 40 | 18 | 1.5 | 140 | 32 |
| LAH | 40 | 18 | 1.8 | 170 | 28 |
| LAH | 40 | 18 | 1.8 | 200 | 325 |
| LAH | 40 | 18 | 2.0 | 200 | 244 |
| LAH | 40 | 37 | 1.2 | 80 | 24 |
| LAH | 40 | 37 | 1.2 | 110 | 30 |
| LAH | 40 | 37 | 1.2 | 140 | 98 |
| LAH | 40 | 37 | 1.1 | 170 | 27 |
| LAH | 40 | 37 | 1.0 | 200 | 55 |
| IGT | 44 | 10 | 1.4 | 80 | 22 |
| IGT | 44 | 18 | 1.0 | 80 | 387 |
| IGT | 44 | 37 | 1.2 | 80 | +500 |
| IGT | 44 | 18 | 1.0 | 80 | 21 |
| IGT | 44 | 18 | 1.2 | 110 | 42 |
| IGT | 44 | 18 | 1.5 | 140 | +500 |
| IGT | 44 | 37 | 1.2 | 80 | 84 |
| IGT | 44 | 37 | 1.2 | 110 | 73 |
| IGT | 44 | 37 | 1.2 | 140 | 58 |
| IGT | 44 | 37 | 1.1 | 170 | 40 |
| IGT | 44 | 37 | 1.0 | 200 | +500 |
| IGT | 44 | 18 | 1.5 | 140 | 28 |
| IGT | 44 | 18 | 1.8 | 170 | 24 |
| IGT | 44 | 18 | 1.8 | 200 | 108 |

TABLE V-continued

Performance of Test Composition No. 25
With Various Cement Systems

| Cement Type[1] | H₂O (% BWOC)[2] | NaCl (% BWOW)[3] | Comp. No. 25 (% BWOC) | BHCT (°F.) | API Fluid Loss (mL/30 Min.) |
|---|---|---|---|---|---|
| IGT | 44 | 37 | 1.2 | 200 | 38 |

CODES:
[1]OA — Oklahoma Class A
LH — Lone Star Class H
IGD — Ideal Class G (Devil's Slide)
LAH — Louisiana Class H
IGT — Ideal Class G (Trident)
[2]by weight of cement (BWOC)
[3]by weight of mix water (BWOW)

In order to evaluate the use of lignosulfonate retarders in the salt water slurries containing the sulfonated aromatic polymers, a study to identify suitable compositions that include the water soluble lignosulfonates was performed. A series of 50 compositions were tested and the results of the experiments to identify a salt water fluid loss additive that would be effective throughout the cement placement time are found in Table VII. In Tests 1 through 23, the ratios of four materials were varied and fluid loss control was evaluated at 80° to 200° F. and from 18 percent to 37 percent NaCl in the mix water. The four materials being varied were: sodium lignosulfonate, SPS/MA 3, SPVT and SPN/F 3. The sodium lignosulfonate, for reasons not fully understood, eliminated the need for the presence of SPS 70. As such, the water soluble lignosulfonates and the sulfonated polystyrenes and mixtures thereof are considered alternates and equivalent compositions for purposes of this invention. As a result of the first 23 test compositions, an optimum composition was identified which provided excellent fluid loss control within the extremes of the conditions. At 200° F., fluid loss control was measured following 3 hours continuous stirring period. The optimum composition consisted of 19 percent sodium lignosulfonate, 19 percent SPS/MA 3, 19 percent SPVT and 43 percent SPN/F 3. This composition was nominally designated XE and represents the primary additive for Tests 24 through 60.

As indicated in Table VII, XE was thoroughly tested as to its ability to provide fluid loss control. Analogous to the previous test composition No. 25, it was necessary to add the new material (XE) at a critical level to achieve acceptable fluid loss control. Tests 24 through 28 of Table VII effectively illustrate this point. Unlike the previous test composition 25, XE was not as strong a retarder. In Tests 44, 46 and 51, the slurries containing XE set in the consistometer during the 3 hour stirring period. Additional sodium lignosulfonate was necessary to allow the fluid loss test to proceed.

TABLE VII

FLUID LOSS TEST RESULTS OF SULFONATED AROMATIC POLYMERS WITH LIGNOSULFONATE

| Test No. | Cement Code | Additives | | | | | | | | Water | | BHCT (°F.) | Fluid Loss (mL/30 min) |
|---|---|---|---|---|---|---|---|---|---|---|---|---|---|
| | | Type | % | Type | % | Type | % | Type | % | Type | % | | |
| 1 | OH/SF | SL | 0.45 | SPS/MA 3 | 0.23 | SPVT | 0.23 | SPN/F 3 | 0.45 | 18 | 50 | 200 | 210 |
| 2 | OH/SF | SL | 0.45 | SPS/MA 3 | 0.30 | SPVT | 0.30 | SPN/F 3 | 0.45 | 18 | 50 | 200 | 90 |
| 3 | OH/SF | SL | 0.45 | SPS/MA 3 | 0.33 | SPVT | 0.33 | SPN/F 3 | 0.45 | 18 | 50 | 200 | 75* |
| 4 | OH/SF | SL | 0.45 | SPS/MA 3 | 0.35 | SPVT | 0.35 | SPN/F 3 | 0.45 | 18 | 50 | 200 | 52 |
| 5 | OH/SF | SL | 0.45 | SPS/MA 3 | 0.38 | SPVT | 0.38 | SPN/F 3 | 0.45 | 18 | 50 | 200 | 170 |
| 6 | OH/SF | SL | 0.45 | SPS/MA 3 | 0.30 | SPVT | 0.35 | SPN/F 3 | 0.45 | 18 | 50 | 200 | 85 |
| 7 | OH/SF | SL | 0.40 | SPS/MA 3 | 0.30 | SPVT | 0.35 | SPN/F 3 | 0.45 | 18 | 50 | 200 | 125 |
| 8 | OH/SF | SL | 0.40 | SPS/MA 3 | 0.30 | SPVT | 0.35 | SPN/F 3 | 0.45 | 18 | 50 | 200 | 90* |
| 9 | OH/SF | SL | 0.45 | SPS/MA 3 | 0.35 | SPVT | 0.40 | SPN/F 3 | 0.50 | 18 | 50 | 200 | 66 |
| 10 | OH/SF | SL | 0.59 | SPS/MA 3 | 0.46 | SPVT | 0.45 | SPN/F 3 | 0.65 | 37 | 30 | 200 | 38 |
| 11 | OH | SL | 0.59 | SPS/MA 3 | 0.46 | SPVT | 0.45 | SPN/F 3 | 0.65 | 37 | 40 | 80 | 370 |
| 12 | OH | SL | 0.34 | SPS/MA 3 | 0.27 | SPVT | 0.36 | SPN/F 3 | 0.38 | 37 | 40 | 80 | 350 |
| 13 | OH | SL | 0.34 | SPS/MA 3 | 0.34 | SPVT | 0.36 | SPN/F 3 | 0.38 | 37 | 40 | 80 | 350 |
| 14 | OH | SL | 0.34 | SPS/MA 3 | 0.27 | SPVT | 0.36 | SPN/F 3 | 0.45 | 37 | 40 | 80 | 350 |
| 15 | OH | SL | 0.34 | SPS/MA 3 | 0.27 | SPVT | 0.36 | SPN/F 3 | 0.50 | 37 | 40 | 80 | +500 |
| 16 | OH | SL | 0.34 | SPS/MA 3 | 0.35 | SPVT | 0.35 | SPN/F 3 | 0.77 | 37 | 40 | 80 | 50 |
| 17 | OH | SL | 0.34 | SPS/MA 3 | 0.35 | SPVT | 0.35 | SPN/F 3 | 0.70 | 37 | 40 | 80 | 350 |
| 18 | OH | SL | 0.34 | SPS/MA 3 | 0.35 | SPVT | 0.35 | SPN/F 3 | 0.77 | 18 | 40 | 200 | 125 |
| 19 | OH | SL | 0.38 | SPS/MA 3 | 0.39 | SPVT | 0.39 | SPN/F 3 | 0.85 | 18 | 40 | 200 | 73 |
| 20 | OH/SF | SL | 0.58 | SPS/MA 3 | 0.60 | SPVT | 0.60 | SPN/F 3 | 1.31 | 18 | 50 | 200 | 27 |
| 21 | OH/SF | SL | 0.58 | SPS/MA 3 | 0.60 | SPVT | 0.60 | SPN/F 3 | 1.31 | 18 | 50 | 200 | 50* |
| 22 | OH | SL | 0.38 | SPS/MA 3 | 0.39 | SPVT | 0.39 | SPN/F 3 | 0.85 | 37 | 40 | 200 | 20 |
| 23 | OH | SL | 0.38 | SPS/MA 3 | 0.39 | SPVT | 0.39 | SPN/F 3 | 0.85 | 18 | 40 | 80 | 33 |
| 24 | OH | XE | 1.50 | — | — | — | — | — | — | 37 | 40 | 80 | +500 |
| 25 | OH | XE | 1.60 | — | — | — | — | — | — | 37 | 40 | 80 | +500 |
| 26 | OH | XE | 1.70 | — | — | — | — | — | — | 37 | 40 | 80 | 90 |
| 27 | OH | XE | 1.80 | — | — | — | — | — | — | 37 | 40 | 80 | 41 |
| 28 | OH | XE | 1.90 | — | — | — | — | — | — | 18 | 40 | 80 | 25 |
| 29 | OH | XE | 1.80 | — | — | — | — | — | — | 18 | 40 | 80 | 25 |
| 30 | OH | XE | 1.60 | — | — | — | — | — | — | 18 | 40 | 80 | 26 |
| 31 | OH | XE | 1.40 | — | — | — | — | — | — | 18 | 40 | 80 | 30 |
| 32 | OH | XE | 1.20 | — | — | — | — | — | — | 18 | 40 | 80 | +500 |
| 33 | OH | XE | 1.90 | — | — | — | — | — | — | 37 | 40 | 200 | 22 |
| 34 | OH | XE | 1.7 | — | — | — | — | — | — | 37 | 40 | 200 | 27 |
| 35 | OH | XE | 1.6 | — | — | — | — | — | — | 37 | 40 | 200 | 27 |
| 36 | OH | XE | 1.4 | — | — | — | — | — | — | 37 | 40 | 200 | 27 |
| 37 | OH | XE | 1.2 | — | — | — | — | — | — | 37 | 40 | 200 | 41 |
| 38 | OH | XE | 1.1 | — | — | — | — | — | — | 37 | 40 | 200 | 34 |
| 39 | OH | XE | 1.9 | — | — | — | — | — | — | 18 | 40 | 200 | 170 |
| 40 | OH | XE | 1.1 | — | — | — | — | — | — | 37 | 40 | 200 | BO* |
| 41 | OH | XE | 2.0 | — | — | — | — | — | — | 18 | 40 | 200 | BO* |
| 42 | OH | XE | 1.5 | — | — | — | — | — | — | 18 | 40 | 130 | 23 |
| 43 | OH | XE | 1.8 | — | — | — | — | — | — | 37 | 40 | 130 | 68 |
| 44 | OH | XE | 1.2 | — | — | — | — | — | — | 18 | 40 | 170 | SET* |

TABLE VII-continued
FLUID LOSS TEST RESULTS OF SULFONATED AROMATIC POLYMERS WITH LIGNOSULFONATE

| Test No. | Cement Code | Additives | | | | | | | | Water | | BHCT (°F.) | Fluid Loss (mL/30 min) |
|---|---|---|---|---|---|---|---|---|---|---|---|---|---|
| | | Type | % | Type | % | Type | % | Type | % | Type | % | | |
| 45 | OH | XE | 1.3 | — | — | — | — | — | — | 37 | 40 | 170 | BO* |
| 46 | OH | XE | 2.0 | — | — | — | — | — | — | 18 | 40 | 170 | SET* |
| 47 | OH | XE | 1.7 | — | — | — | — | — | — | 37 | 40 | 170 | 18* |
| 48 | OH | XE | 1.8 | SL | 0.1 | — | — | — | — | 18 | 40 | 170 | 46* |
| 49 | IGT/SF | XE | 2.0 | — | — | — | — | — | — | 18 | 54 | 200 | 31* |
| 50 | IGT/SF | XE | 2.0 | — | — | — | — | — | — | 37 | 54 | 200 | 16* |
| 51 | IGT | XE | 1.8 | SL | 0.1 | — | — | — | — | 18 | 44 | 170 | SET* |
| 52 | IGT | XE | 1.5 | SL | 0.2 | — | — | — | — | 18 | 44 | 170 | 190* |
| 53 | IGT | XE | 1.5 | SL | 0.1 | — | — | — | — | 37 | 44 | 170 | 18* |
| 54 | IGT | XE | 1.8 | SL | 0.3 | — | — | — | — | 18 | 44 | 170 | 19* |
| 55 | IGT | XE | 1.3 | — | — | — | — | — | — | 18 | 44 | 130 | 30 |
| 56 | IGT | XE | 1.3 | — | — | — | — | — | — | 37 | 44 | 130 | 28 |
| 57 | IGT | XE | 1.5 | — | — | — | — | — | — | 18 | 44 | 80 | 50 |
| 58 | IGT | XE | 1.7 | — | — | — | — | — | — | 37 | 44 | 80 | 60 |
| 59 | IGT | XE | 2.0 | SL | 0.1 | FA/S | 79 | Bent | 2.0 | 37 | 59 | 200 | 40 |
| 60 | LH/SF | XE | 3.0 | — | — | — | — | — | — | 37 | 50 | 240 | 200 |

Cement Codes:
OH/SF — Oklahoma H + 35% silica flour
OH — Oklahoma H
IGT/SF — Ideal Trident G + 35% silica flour
IGT — Ideal Trident G
LH/SF — Lonsestar (New Orleans) H + 35% silica flour
Additive Codes:
SL — Sodium Lignosulfonate
SPS/MA 3 — Versa - SPS/MA 3
SPVT — Polyvinyltoluene Sulfonate
SPN/F 3 — Naphthalene Sulfonate, Formaldehyde Condensate
XE — 19% SPS/MA 3, 19% SPVT, 19% SPN/F 3, 43% SL
FA/S — Sidney, MT fly ash
Bent — Bentonite
*3 hour stir at BHCT In view of these test data, the sulfonated poly(vinyl aromatic) compounds of the present invention represent commercially significant additives for fluid loss control. In particular, the test composition XE has proved to be highly suitable for field usage and has been successfully tested under controlled field conditions.

The advantages and benefits of using the improved cement additives and hydraulic cement compositions according to the present invention are considered numerous and commercially significant. Primarily, the additives are useful in that they impart effective fluid loss control to cement slurries containing elevated amounts of sodium chloride. In particular, the additives and resulting salt water cement slurries are surprisingly effective at temperatures above 140° F. BHCT which has previously been considered an upper operative limit for many prior art fluid loss additives. Also in contrast to prior art fluid loss additives, the compositions of the present invention to not exhibit deleterious and undesirable retardation that either postpones or prevents the necessary development of strength in the cement. The additives also act as dispersants.

The actual selection of the poly(vinyl aromatic) polymers to be blended and employed in the novel salt water fluid loss additive according to the present invention can be from any of the contemporary commercial sources and products as generally known in the art. As such, polymers are preferably purchased in a dry powder form; however, alternates to powders, including slurries and solutions, are deemed to be equivalent for purposes of this invention. Also, it should be appreciated that various additives to these polymers can be present, particularly in commercially available sources (e.g., the presence of various stabilizers, antioxidants, and the like). Thus, experience indicates that various stabilized polymers (e.g., sodium carbonate stabilized sulfonated polystyrene) are acceptable for purposes of this invention. The skilled artisan will recognize that any blend or combination poly(vinyl aromatics) polymers actually selected for commercial use, even within a given category, should be tests with the cements to be used to determine the degree of efficacy in a manner analogous to the previous evaluations. This is easily within the skill of the art.

It should be appreciated from the above description that the term "salt water" for purposes of this invention means and includes, by way of example, but not limited thereto, sea water, brines and other aqueous solutions of salts including ammonium, alkali metal and alkaline earth, metal halides and nitrates having salt concentrations as herein referenced up to and including saturation. It should be further appreciated that salts other than those mentioned above (e.g., bicarbonates, phosphates and sulphates) can be tolerated in the cement slurries of this invention to some extent, even though they may react with or alter the performance of the slurries to some degree. Thus, the term "salt water cement slurry" as used herein means a cement slurry comprised of water, cement, one or more salts and other components or additives to bring about the desired slurry properties and is to include salt water cement slurries generated or produced in situ during an oil or gas well cement job by virtue of encountering a downhole salt formation or invasion of a brackish water into the borehole.

Having thus described the invention with a certain degree of particularity, it is manifest that many changes can be made in the details of the invention without departing from the spirit and scope of the invention. Therefore, it is to be understood that the invention is not limited to the embodiments set forth herein for purposes of exemplification, but is to be limited only by the scope of the attached claims, including a full range of equivalents to which each element thereof is entitled.

I claim:

1. In a salt water cement slurry containing a hydraulic cement and salt water, the improvement consisting of including in said slurry an effective amount of a fluid loss additive which comprises an admixture of at least:
    (a) about 0.5 parts of a water soluble sulfonated styrene/maleic anhydride copolymer;
    (b) about 0.5 parts of a water soluble salt of a sulfonated polystyrene;
    (c) about 0.5 parts of a water soluble salt of a sulfonated polyvinyltoluene; and
    (d) about 0.5 parts of a water soluble salt of sulfonated polynaphthalene/formaldehyde condensate; wherein all parts are parts by weight per 100 parts by weight of dry hydraulic cement.

2. A salt water cement slurry of claim 1 wherein said admixture further comprises at least about 0.5 parts by weight of a water soluble lignosulfonate per 100 parts by weight of dry hydraulic cement.

3. A salt water cement slurry of claim 1 wherein said water soluble sulfonated styrene/maleic anhydride copolymer is present in said admixture from about 0.5 parts by weight to about 1.0 parts by weight per 100 parts by weight of dry hydraulic cement, said water soluble salt of a sulfonated polystyrene is present in said admixture in from about 0.5 parts by weight to about 2.0 parts by weight per 100 parts by weight of dry hydraulic cement, said water soluble salt of said sulfonated polyvinyltoluene is present in said admixture from about 2.4 parts by weight to about 0.5 parts by weight per 100 parts by weight of dry hydraulic cement, and said water soluble salt of a sulfonated polynaphthalene/formaldehyde condensate is present in said admixture from about 0.5 parts by weight to about 2.0 parts by weight per 100 parts by weight of dry hydraulic cement.

4. A salt water cement slurry of claim 3 wherein said admixture further comprises, at least about 0.5 parts by weight of a water soluble lignosulfonate per 100 parts by weight of dry hydraulic cement.

5. A salt water cement slurry of claim 1 wherein said admixture further comprises about 0.5 parts by weight of a sodium salt of a sulfonated styrene/maleic anhydride copolymer characterized by a molecular weight of about 3,000 per 100 parts by weight of dry hydraulic cement, 1.0 parts by weight of a sodium salt of a sulfonated polystyrene characterized by a molecular weight of about 70,000 per 100 parts by weight of dry hydraulic cement, 2.0 parts by weight of a sodium salt of a sulfonated polyvinyltoluene characterized by a molecular weight of about 500,000 per 100 parts by weight of dry hydraulic cement, and 0.5 parts by weight of a sodium salt of a sulfonated polynaphthalene/formaldehyde condensate characterized by a molecular weight of about 10,000 per 100 parts by weight of dry hydraulic cement.

6. A salt water cement slurry of claim 1 wherein said admixture further comprises about 1.0 parts by weight of a sodium salt of a sulfonated styrene/maleic anhydride copolymer characterized by a molecular weight of about 3,000 per 100 parts by weight of dry hydraulic cement, 0.1 parts by weight of a sodium salt of a sulfonated polystyrene characterized by a molecular weight of about 70,000 per 100 parts by weight of dry hydraulic cement, 0.9 parts by weight of a sodium salt of a sulfonated polyvinyltoluene characterized by a molecular weight of about 500,000 per 100 parts by weight of dry hydraulic cement, and 2.0 parts by weight of a sodium salt of a sulfonated polynaphthalene/formaldehyde condensate characterized by a molecular weight of about 10,000 per 100 parts by weight of dry hydraulic cement.

7. A salt water cement slurry of claim 5 wherein said admixture further comprises at least 0.5 parts by weight of a water soluble lignosulfonate per 100 parts by weight of dry hydraulic cement.

8. A salt water cement slurry of claim 6 wherein said admixture further comprises at least 0.5 parts by weight of a water soluble lignosulfonate per 100 parts by weight of dry hydraulic cement.

9. In a salt water cement slurry containing a hydraulic cement and salt water, the improvement consisting of including in said slurry an effective amount of a fluid loss additive which comprises an admixture of at least:
    (a) about 0.5 parts of a water soluble sulfonated styrene/maleic anhydride copolymer;
    (b) about 0.1 parts of a water soluble lignosulfonate;
    (c) about 0.1 parts of a water soluble salt of a sulfonated polyvinyltoluene; and
    (d) about 0.5 parts of a water soluble salt of a sulfonated polynaphthalene/formaldehyde condensate; wherein all parts are parts by weight per 100 parts by weight of dry hydraulic cement.

10. A salt water cement slurry of claim 9 wherein said water soluble sulfonated styrene/maleic anhydride copolymer is present in said admixture from about 0.5 parts by weight to about 1.0 parts by weight per 100 parts by weight dry hydraulic cement, said water soluble lignosulfonate is present in said admixture in from about 0.1 parts by weight to about 0.5 parts by weight per 100 parts by weight of dry hydraulic cement, said water soluble salt of said sulfonated polyvinyltoluene is present in said admixture from about 2.5 parts by weight to about 0.5 parts by weight per 100 parts by weight dry hydraulic cement, and said water soluble salt of a sulfonated polynaphthalene/formaldehyde condensate is present in said admixture from about 0.1 parts by weight to about 2.0 parts by weight per 100 parts by weight of dry hydraulic cement.

11. A salt water cement slurry of claim 9 wherein said admixture further comprises about 0.8 parts by weight of a sodium salt of a sulfonated styrene/maleic anhydride copolymer characterized by a molecular weight of about 3,000 parts per 100 parts by weight of dry hydraulic cement, about 0.8 parts by weight of a sodium lignosulfonate per 100 parts by weight of dry hydraulic cement, about 0.8 parts by weight of a sodium salt of sulfonated polyvinyltoluene characterized by a molecular weight of about 500,000 per 100 parts by weight of dry hydraulic cement, and about 1.7 parts by weight of a sodium salt of sulfonated polynaphthalene/formaldehyde condensate characterized by a molecular weight of about 10,000 per 100 parts by weight of a dry hydraulic cement.

12. A method of cementing a well traversing a subterranean formation consisting of admixing with every 100 parts by weight of a dry hydraulic cement at least:
    (a) 0.5 parts by weight of a water soluble sulfonated styrene/maleic anhydride copolymer per 100 parts by weight of dry hydraulic cement;
    (b) 0.5 parts by weight of a water soluble salt of a sulfonated polystyrene per 100 parts by weight of dry hydraulic cement;
    (c) 0.5 parts by weight of a water soluble salt of a sulfonated polyvinyltoluene; and
    (d) 0.5 parts by weight of a water soluble salt of sulfonated polynaphthalene/formaldehyde condensate and from about 35 to 55 parts by weight of a saline water solution, to prepare an aqueous slurry, and injecting said slurry down the well into a confined zone in the formation, and permitting said slurry to set and harden.

13. A method of cementing a well of claim 12 wherein said admixing further comprises about 0.5 parts by weight of a sodium salt of a sulfonated styrene/maleic anhydride copolymer characterized by a molecular weight of about 3,000 per 100 parts by weight of dry hydraulic cement, 1.0 parts by weight of a sodium salt of a sulfonated polystyrene characterized by a molecular weight of about 70,000 per 100 parts by weight of dry hydraulic cement, 2.0 parts by weight of a sodium salt of a sulfonated polyvinyltoluene characterized by a molecular weight of about 500,000 per 100 parts by weight of dry hydraulic cement, and 0.5 parts by weight of a sodium salt of a sulfonated polynaphthalene/formaldehyde condensate characterized by a molecular weight of about 10,000 per 100 parts by weight of dry hydraulic cement.

14. A method of cementing a well of claim 12 wherein said admixing further comprises about 1.0 parts by weight of a sodium salt of a sulfonated styrene/maleic anhydride copolymer characterized by a molecular weight of about 3,000 per 100 parts by weight of dry hydraulic cement, 0.1 parts by weight of a sodium salt of a sulfonated polystyrene characterized by a molecular weight of about 70,000 per 100 parts by weight of dry hydraulic cement, 0.9 parts by weight of a sodium salt of a sulfonated polyvinyltoluene characterized by a molecular weight of about 500,000 per 100 parts by weight of dry hydraulic cement, and 2.0 parts by weight of a sodium salt of a sulfonated polynaphthalene/formaldehyde condensate characterized by a molecular weight of about 10,000 per 100 parts by weight of dry hydraulic cement.

15. A method of cementing a well of claim 13 wherein said admixing further comprises at least 0.5 parts by weight of a water soluble lignosulfonate per 100 parts by weight of dry hydraulic cement.

16. A method of cementing a well of claim 14 wherein said admixing further comprises at least 0.5 parts by weight of a water soluble lignosulfonate per 100 parts by weight of dry hydraulic cement.

17. A method of cementing a well traversing a subterranean formation consisting of admixing with every 100 parts by weight of a dry hydraulic cement at least:
(a) about 0.5 parts by weight of a water soluble sulfonated styrene/maleic anhydride copolymer;
(b) about 0.1 parts by weight of a water soluble lignosulfonate;
(c) about 0.1 parts by weight of a water soluble salt of a sulfonated polyvinyltoluene; and
(d) about 0.5 parts by weight of a water soluble salt of a sulfonated polynaphthalene/formaldehyde condensate and from about 35 to 55 parts by weight of a saline water solution, to prepare an aqueous slurry, and injecting said slurry down the well into a confined zone in the formation, and permitting said slurry to set and harden.

18. A method of cementing a well according to claim 17 wherein said water soluble sulfonated styrene/maleic anhydride copolymer is present in said admixture from about 0.5 parts by weight to about 1.0 parts by weight per 100 parts by weight dry hydraulic cement, said water soluble lignosulfonate is present in said admixture in from about 0.1 parts by weight to about 0.5 parts by weight per 100 parts by weight of dry hydraulic cement, said water soluble salt of said sulfonated polyvinyltoluene is present in said admixture from about 2.5 parts by weight to about 0.5 parts by weight per 100 parts by weight dry hydraulic cement, and said water soluble salt of a sulfonated polynaphthalene/formaldehyde condensate is present in said admixture from about 0.1 parts by weight to about 2.0 parts by weight per 100 parts by weight of dry hydraulic cement.

19. A method of cementing a well of claim 17 wherein said admixture further comprises about 0.9 parts by weight of a sodium salt of a sulfonated styrene/maleic anhydride copolymer characterized by a molecular weight of about 3,000 per 100 parts by weight of dry hydraulic cement, about 0.8 parts by weight of a sodium lignosulfonate per 100 parts by weight of dry hydraulic cement, about 0.8 parts by weight of a sodium salt of sulfonated polyvinyltoluene characterized by a molecular weight of about 500,000 per 100 parts by weight of dry hydraulic cement, and about 1.7 parts by weight of a sodium salt of sulfonated polynaphthalene/formaldehyde condensate characterized by a molecular weight of about 10,000 parts by weight of a dry hydraulic cement.

20. A composition having properties making it useful as a fluid loss additive in salt water cement slurries comprising for every 100 parts by weight of additive:
(a) from about 12.5 parts by weight to about 25 parts by weight of a water soluble sulfonated polystyrene/maleic anhydride copolymer;
(b) from about 2.5 parts by weight to about 50 parts by weight of a compound selected from the group consisting of:
(i) a water soluble salt of a sulfonated polystyrene,
(ii) a water soluble lignosulfonate, and sulfonated polystyrene and a water soluble lignosulfonate;
(c) from about 12.5 parts by weight to about 60 parts by weight of a water soluble salt of a sulfonated polyvinyltoluene; and
(d) from about 12.5 parts by weight to about 50 parts by weight of a water soluble salt of naphthalene sulfonate/formaldehyde condensate.

21. A cement slurry additive composition of claim 20 further comprising for every 100 parts by weight of additive:
(a) about 19 parts by weight of a water soluble salt of a sulfonated polystyrene/maleic anhydride copolymer characterized by the molecular weight of about 3,000;
(b) about 19 parts by weight of a water soluble salt of lignosulfonate;
(c) about 19 parts by weight of a water soluble salt of a sulfonated polyvinyltoluene characterized by a molecular weight of about 500,000; and
(d) about 43 parts by weight of a water soluble salt of naphthalene sulfonate/formaldehyde condensate characterized by a molecular weight of about 10,000.

22. A cement slurry additive composition of claim 20 comprising for every 100 parts by weight of additive:
(a) about 12.5 parts by weight of a water soluble salt of a sulfonated styrene/maleic anhydride copolymer characterized by a molecular weight of about 3,000;
(b) about 25 parts by weight of a water soluble salt of a sulfonated polystyrene characterized by a molecular weight of about 70,000;

(c) about 50 parts by weight of a water soluble salt of a sulfonated polyvinyltoluene characterized by a molecular weight of about 500,000; and (d) about 12.5 parts by weight of a water soluble salt of naphthalene sulfonate/formaldehyde condensate characterized by a molecular weight of about 10,000.

23. A cement slurry additive composition of claim 20 comprising for every 100 parts by weight of additive:

(a) about 25 parts by weight of a water soluble salt of a sulfonated styrene/maleic anhydride copolymer characterized by a molecular weight of about 3,000;

(b) about 2.5 parts by weight of a water soluble salt of a sulfonated polystyrene characterized by a molecular weight of about 70,000;

(c) about 22.5 parts by weight of a water soluble salt of a sulfonated polyvinyltoluene characterized by a molecular weight of about 500,000; and (d) about 50 parts by weight of a water soluble salt of a naphthalene sulfonate/formaldehyde condensate characterized by a molecular weight of about 10,000.

* * * * *